United States Patent
Götzenberger et al.

(10) Patent No.: US 12,296,702 B2
(45) Date of Patent: May 13, 2025

(54) GALVANICALLY COUPLING DC-TO-DC CONVERTER AND VEHICLE ELECTRICAL SYSTEM

(71) Applicant: Vitesco Technologies GMBH, Regensburg (DE)

(72) Inventors: Martin Götzenberger, Ingolstadt (DE); Franz Pfeilschifter, Wenzenbach (DE)

(73) Assignee: Vitesco Technologies GmbH, Regensburg (DE)

( * ) Notice: Subject to any disclaimer, the term of this patent is extended or adjusted under 35 U.S.C. 154(b) by 276 days.

(21) Appl. No.: 17/942,314

(22) Filed: Sep. 12, 2022

(65) Prior Publication Data

US 2023/0001811 A1  Jan. 5, 2023

Related U.S. Application Data

(63) Continuation of application No. PCT/EP2021/055750, filed on Mar. 8, 2021.

(30) Foreign Application Priority Data

Mar. 11, 2020  (DE) .................. 102020203143.6

(51) Int. Cl.
 *B60L 53/22* (2019.01)
 *H02M 3/158* (2006.01)

(52) U.S. Cl.
 CPC ............ *B60L 53/22* (2019.02); *H02M 3/158* (2013.01); *B60L 2210/10* (2013.01)

(58) Field of Classification Search
 CPC ...... B60L 53/22; B60L 2210/10; H02M 3/158

USPC ........................................... 323/222
See application file for complete search history.

(56) References Cited

U.S. PATENT DOCUMENTS

| | | | | |
|---|---|---|---|---|
| 7,292,462 B2 * | 11/2007 | Watanabe | ............... | H02M 3/07 363/60 |
| 9,948,193 B2 * | 4/2018 | Ragonese | ......... | H02M 3/33584 |
| 10,063,142 B2 | 8/2018 | Kaiser et al. | | |
| 2014/0111005 A1 | 4/2014 | Liu et al. | | |
| 2017/0085170 A1 | 3/2017 | Li et al. | | |

(Continued)

FOREIGN PATENT DOCUMENTS

| | | |
|---|---|---|
| CN | 109367417 A | 2/2019 |
| CN | 209079670 U | 7/2019 |
| DE | 102014203157 A1 | 8/2015 |

(Continued)

OTHER PUBLICATIONS

Korean Office Action dated May 3, 2024 for corresponding Korean Patent Application No. 10-2022-7034278.
(Continued)

*Primary Examiner* — Yemane Mehari

(57) ABSTRACT

A galvanically coupling DC-to-DC converter has a first side and a second side. The first side has a first potential and a second potential. The DC-to-DC converter has a first, a second and a third transistor. The transistors are connected in a series circuit via a first and a second connecting point and are connected between the potentials of the first side. A respective load inductor is connected to the two connecting points. The load inductors are each connected between one of the connecting points and one of two potentials of the second side of the DC-to-DC converter.

13 Claims, 1 Drawing Sheet

(56) References Cited

U.S. PATENT DOCUMENTS

2022/0340027 A1* 10/2022 Pfeilschifter ........... B60L 53/22

FOREIGN PATENT DOCUMENTS

| DE | 102017010390 A1 * | 5/2018 | | |
|---|---|---|---|---|
| KR | 20170014069 A | 2/2017 | | |
| KR | 20200022569 A | 3/2020 | | |
| WO | WO-2020063010 A1 * | 4/2020 | ............ | H02M 1/126 |

OTHER PUBLICATIONS

Yao Zhigang et al., "Voltage Self-Balance Mechanism Based on Zero-Voltage Switching for Three-Level DC-DC Converter", IEEE Transactions On Power Electronics Institute Of Electrical And Electronics Engineers, Bd. 35, Nr. 10, USA, 2020.

* cited by examiner

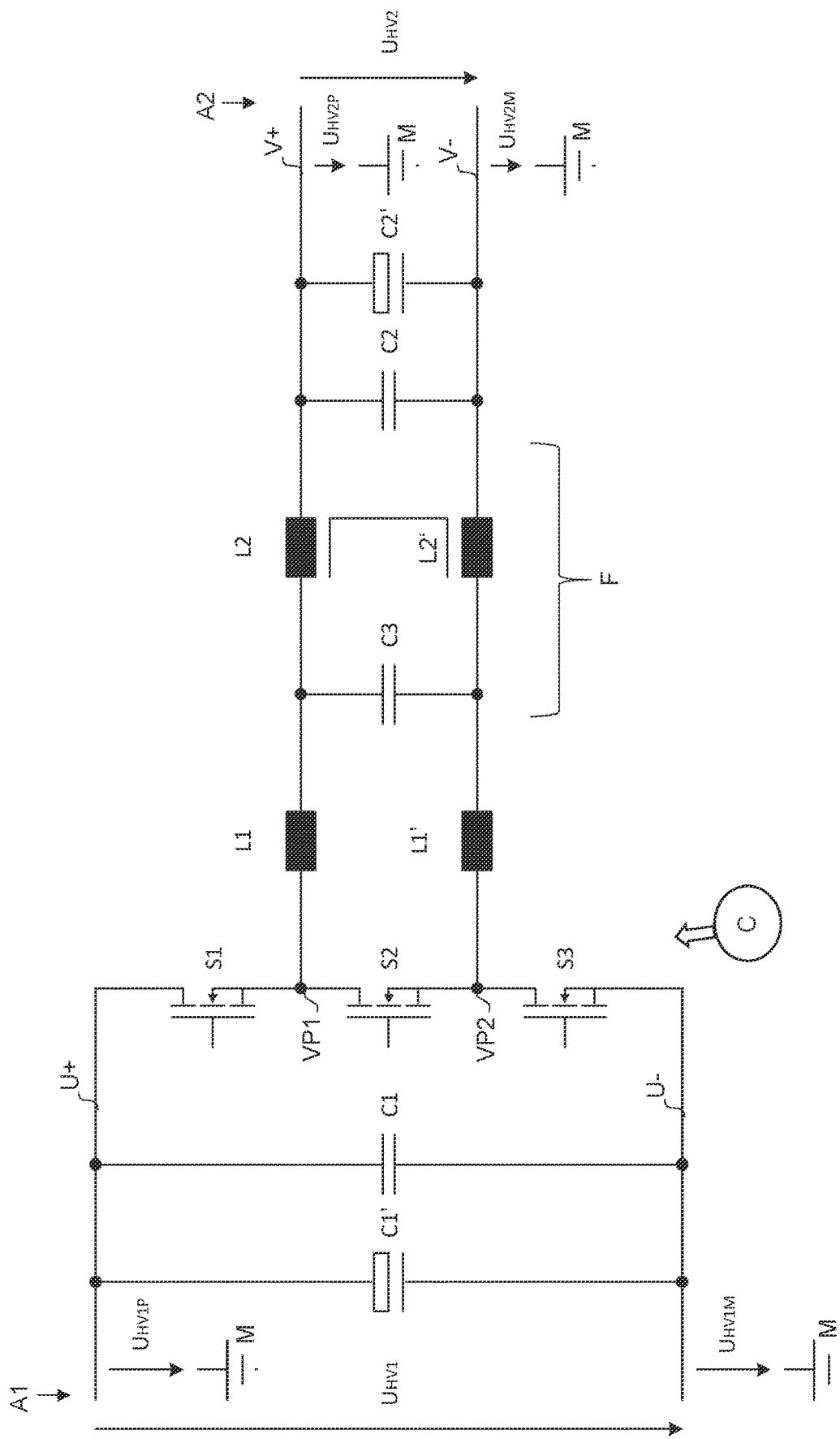

GALVANICALLY COUPLING DC-TO-DC CONVERTER AND VEHICLE ELECTRICAL SYSTEM

CROSS-REFERENCE TO RELATED APPLICATIONS

This application claims priority to PCT Application PCT/2021/055750, filed Mar. 8, 2021, which claims priority to German Patent Application No. DE 10 2020 203 143.6, filed Mar. 11, 2020. The disclosures of the above applications are incorporated herein by reference.

FIELD OF THE INVENTION BACKGROUND OF THE INVENTION

Vehicles having an electric drive have an on-board electrical system, in which high voltages of, for example, 400 V or 800 V are used as the operating voltage in order to support high powers. In some cases, voltages of for example 400 V are desired, for instance for AC charging or else for driving, whereas other applications require higher voltages, for example of 800 V, for instance if DC voltage should be used for charging or high powers have to be achieved when driving. Furthermore, high-voltage components can exist that have a nominal voltage of 400 V, for instance electric heaters, whereas other components, for instance the rechargeable traction battery charging electronics and/or the electric drive, have a different high voltage as the nominal voltage, e.g. 800 V.

SUMMARY OF THE INVENTION

DC-to-DC converters that couple on-board electrical system branches having different nominal voltages to one another in a power-transmitting manner are used so that not every one of the on-board electrical system branches having different nominal voltages has to be equipped with its own rechargeable battery. It is an object of the invention to present a possibility that allows coupling circuits of this kind to be realized in a simple manner.

This object is achieved by the DC-to-DC converter and by the vehicle on-board electrical system as described herein. Further properties, features, and embodiments emerge from the FIGURE and the description.

It is proposed to provide a galvanically coupling DC-to-DC converter having three transistors connected in series. The transistors are connected in series and therefore form a series circuit of three switches, in contrast to conventional half-bridges with two switches. The load inductors are distributed symmetrically around the middle transistor, namely the second transistor, and connected to the series circuit of the transistors. The symmetrical arrangement makes it possible, by the DC-to-DC converter, to produce a voltage that is symmetrical with respect to the input voltage. Therefore, no potential of the output voltage corresponds to an input potential. It is thereby possible to shift the output voltage with respect to the input voltage, wherein this is set by actuating the transistors.

A galvanically coupling DC-to-DC converter that has a first side and a second side is therefore proposed. The first side is considered as the input side and the second side as the output side. The first side includes a two-pole connection (or is equated thereto) and the second side likewise includes a two-pole connection (or is equated thereto). The first side therefore has two potentials, wherein the second side also has two potentials.

The DC-to-DC converter has a first, a second and a third transistor as converter switching elements. These are connected to one another in a series circuit via a first and a second connecting point. The first connecting point is between the first and the second transistor. The second connecting point is between the second and the third transistor. The ends of the series circuit are connected to the two potentials of the first side or the first connection. A respective load inductor is connected to the two connecting points. The load inductors are each connected in series to the connecting points. Therefore, only one end of each load inductor is connected to one of the two connecting points. The load inductors are connected to different connecting points. The load inductors are each connected between one of the connecting points and one of two potentials of the second side of the DC-to-DC converter. The load inductors are therefore connected in series between the second side (that is to say the second connection) of the DC-to-DC converter and the connecting points. The first load inductor is connected in series between the first connecting point and a first one of the two potentials of the second side of the DC-to-DC converter. The second load inductor is connected in series between the second connecting point and the second potential of the second side of the DC-to-DC converter. The load inductors connect different operating points to different potentials of the second side of the DC-to-DC converter. The load inductors are therefore connected or arranged symmetrically to the second transistor.

The load inductors are in an embodiment connected in series between the connecting points connected thereto and the second side. The connection between the connecting points, on the one hand, and the potentials of the second side of the DC-to-DC converter, on the other hand, may be direct, or in an embodiment also includes a filter element (as a series element). The second side is therefore connected directly to those ends of the load inductor that are remote from the connecting points. A common-mode choke is provided between the load inductors and the second side (that is to say the two potentials of the second side), however. The second side is therefore connected, via a common-mode choke, to those ends of the load inductor that are remote from the connecting points. To this end, the common-mode choke may have two inductors (which in an embodiment are symmetrical to one another), wherein one inductor is provided between the first load inductor and the first potential of the second side and a second inductor between the second load inductor and the second potential of the second side. The inductors are magnetically coupled, in an embodiment, by these being wound around the same magnetic core.

The first side, the second side, or both sides may (each) have an intermediate circuit capacitor. The capacitor connects the potentials of the respective side in parallel with one another. A first intermediate circuit capacitor is connected between the potentials of the first side. As an alternative or in combination therewith, an intermediate circuit capacitor may connect the ends of the load inductors that are remote from the transistors to one another. In an embodiment, an intermediate circuit capacitor is provided between the load inductors and the common-mode choke. Also, as an alternative or in combination therewith, an intermediate circuit capacitor is provided at the potentials of the second side of the DC-to-DC converter. This may be the case if a common-mode choke is provided between the load inductors and the potentials of the second side. In this case, one or more intermediate circuit capacitors are considered to be part of a filter circuit or a filter element to which the common-mode choke also belongs. An individual filter choke may also be used instead of a (two-part) common-mode choke.

A controller that is connected to the transistors in an actuating manner is provided. The controller is designed to prevent all three transistors from simultaneously being in the on state. A bridge short circuit is thereby avoided. The controller may also be designed, in a converter state, to actuate the first and the third transistor simultaneously in an on state. In this case, the controller is also designed to actuate the first and the third transistor simultaneously in an off state, or to provide the first and the third transistor in the same state. The controller is in an embodiment designed to actuate the transistors in a clocked manner using a settable duty cycle. The first and the third transistor thereby connect the load inductors to the potentials of the first side (in the on state) or disconnect them (in the off state).

Provision may also be made for the controller, in a converter state, in for example the converter state mentioned above, to change the second transistor, on the one hand, and the first and the third transistor, on the other hand, alternately into an on state. The controller is in an embodiment designed to actuate the second transistor, on the one hand, and the third and the first transistor, on the other hand, alternately in an off state. In an embodiment, the controller is designed, in the converter state, to actuate the second transistor with a switching state that is complementary to the switching states of the first and the third transistor. In the converter state, the first and the third transistor have the same switching state. The controller may turn the second transistor, on the one hand, and the first and the third transistor, on the other hand, on and off in accordance with a predefined duty cycle. In the converter state, the load inductors may therefore, via the first and the third transistor, be connected to the two potentials of the first side, and subsequently disconnected therefrom, whereupon the third transistor is closed in order to connect the two load inductors to one another. The second transistor is subsequently opened again (and the first transistors are closed, as described above). This is executed in a clocked manner, in accordance with a predefined duty cycle, in order, in the converter state, to convert the voltage present at the first side into a voltage that is present at the second side of the converter, or that is present at the ends of the load inductors that are remote from the transistors. If a filter circuit is provided between the load inductors and the second side, this may filter voltage converted in this way and output it at the second side.

The converter state corresponds to a state of the DC-to-DC converter in which the DC-to-DC converter, in accordance with normal operation, converts a voltage, such as the voltage at the first side, in order to output the converted voltage at the second side. The converter state mentioned above is in an embodiment a state of the converter that does not have any insulation faults.

The DC-to-DC converter is in an embodiment galvanically isolated from a reference potential such as ground or a vehicle chassis. There is insulation between the potentials of the DC-to-DC converter, such as the potentials of the first side, and the relevant reference potential. If this insulation is defective, that is to say if the insulation resistance between a potential of the DC-to-DC converter and the reference potential is below a predefined threshold, then there is an insulation fault. The controller is designed to actuate the third transistor continuously in an on state, and to actuate the first transistor and the second transistor alternately in an on state in the event of an insulation fault between the first potential of the first side and a reference potential (ground or vehicle chassis). This corresponds to a converter state with insulation faults (in contrast to the converter state without insulation faults, mentioned above). As an alternative or in combination therewith, the controller is designed to actuate the first transistor continuously in an on state, and to actuate the second transistor and the third transistor alternately in an on state in the event of an insulation fault between the second potential of the first side and a reference potential. This allows voltage conversion in spite of insulation faults, wherein there is no voltage between the relevant potential of the first side and the associated load inductor as a result of the transistor actuated continuously in the on state. If the first transistor is in a continuous on state, the first connecting point, and therefore the relevant end of the load inductor, is at the first potential of the first side. If the third transistor is closed, the second connecting point, or the end of the second load inductor that is connected thereto, is at the second potential of the first side. Provision is made for the controller to alternately actuate a second transistor, on the one hand, and the first and the third transistor, on the other hand (in an on state and an off state) in the event of an insulation fault between the first potential and the second potential with respect to the reference potential for voltage conversion purposes.

The first and the third transistor are connected symmetrically to the second transistor. The first and the third transistor are in an embodiment of identical design (in an embodiment having the same current-carrying capacity and the same switching behavior). The first, the second and the third transistor are in an embodiment of identical design, such as with regard to current-carrying capacity and switching behavior. Additionally, the load inductors are in an embodiment connected symmetrically to the second transistor. The load inductors are also in an embodiment of identical design, in an embodiment having the same inductance value, and also having the same DC resistance or the same current-carrying capacity.

The DC-to-DC converter described here is in an embodiment a DC-to-DC converter in a vehicle, such as within a vehicle on-board electrical system. The DC-to-DC converter may therefore be considered to be a vehicle DC-to-DC converter. The DC-to-DC converter may in an embodiment be part of a vehicle-based charging circuit.

A vehicle on-board electrical system including at least two on-board electrical system branches is also described. These on-board electrical system branches have different nominal voltages, for example approximately 400 V and for example approximately 800 V. The vehicle on-board electrical system has at least one DC-to-DC converter, as is described herein. The DC-to-DC converter connects the two on-board electrical systems that have the different nominal voltages to one another in a voltage-converting manner. A first on-board electrical system having a first nominal voltage in this case may have two potentials that are connected to the two potentials of the first side of the DC-to-DC converter. A second on-board electrical system having another nominal voltage in this case may have two further potentials that are connected to the two potentials of the second side. The DC-to-DC converter described here is in an embodiment a DC-to-DC power converter. The DC-to-DC converter has a converter power of at least 5 kW, 50 kW or 200 kW. The DC-to-DC converter is a high-voltage DC-to-DC converter, wherein both sides are designed for voltages of more than 60 V, of at least 100 V, 200 V, 400 V or 800 V.

BRIEF DESCRIPTION OF THE DRAWINGS

The present invention will become more fully understood from the detailed description and the accompanying drawings, wherein:

FIG. 1 is used to explain the embodiment described here in more detail.

DETAILED DESCRIPTION OF THE PREFERRED EMBODIMENTS

The following description of the preferred embodiment(s) is merely exemplary in nature and is in no way intended to limit the invention, its application, or uses.

FIG. 1 shows a DC-to-DC converter having a first side A1 and a second side A2. The first side A1 has a first potential U+ and a second potential U−. An intermediate circuit capacitor that includes two capacitors C1', C1 is provided between these potentials. These are used to stabilize the voltage at the side A1.

There are three transistors S1 to S3 in a series circuit between the potentials U+ and U− of the first side A1. There results a first connecting point VP1 between the first transistor S1 and the second transistor S2, and a second connecting point VP2 between the second transistor S2 and the third transistor S3. Load inductors L1 and L1' are connected to these connecting points. The load inductor L1 is connected at one end to the connecting point VP1. The second load inductor L1' is connected at one end to the connecting point VP2. Therefore, the two load inductors L1 and L1' in the series circuit lead away from the connecting points VP1, VP2. The load inductors and the transistors are provided between the sides of the DC-to-DC converter.

The ends of the load inductors L1, L1' that are not connected to the connecting points VP1, VP2 are adjoined by a filter circuit that leads to the second side A2. The filter circuit in this case includes a common-mode choke L2, L2' that has two windings that are connected to one another magnetically by way of a common core. An intermediate circuit capacitor C3 that is charged via the load inductors L1, L1' is connected between the common-mode choke L2, L2' and the load inductors L1, L1'.

The DC-voltage choke L2, L2' is also adjoined by an intermediate circuit capacitor C2, C2' that is formed by two components in the form of capacitors. These stabilize the voltage between the first potential V+ and the second potential V− of the second side A2 of the DC-to-DC converter.

There is therefore a filter circuit, to which the common-mode choke L2, L2' belongs and of which the capacitor C3 may form part, between the load inductors L1, L1' and the second side A2.

As is illustrated symbolically, a controller C controls the transistors S1 to S3. In this case, the transistors are actuated in converter mode in such a way that the transistor S2, on the one hand, and the transistors S1 and S3, on the other hand, are alternately switched on and off. This converts the voltage UHV1 at the first side A1 into a voltage UHV2 at the second side A2 of the DC-to-DC converter.

The DC-to-DC converter shown is provided in a vehicle that has a reference potential M, for example the vehicle chassis. This reference potential is galvanically isolated from the potentials U+, U− and V+ and V−. There is therefore a voltage UHV1P between the potential U+ and the reference potential M and a voltage UHV1M between the potential U− and the reference potential M. There is also a voltage UHV2P between the potential V+ and the reference potential M and a voltage UHV2M between the potential V− and the reference potential M. If there is an insulation fault, that is to say if the insulation resistance between the reference potential M and the potentials U+, U−, V+ or V− is not above a minimum value, then there is an insulation fault. The insulation fault is ascertained by voltage detection or by detecting an insulation resistance. If there is an insulation fault between U− and M, that is to say if the voltage UHV1M is too low or indicates an insulation fault in the form of an insulation resistance that is too low, the controller is designed to permanently close the switch S3, whereas the switches S1 and S2 are alternately switched on and off in order to maintain the conversion. If there is an insulation fault between U+ and M, that is to say if the voltage UHV1P is too low or indicates an insulation fault between U+ and M, the transistor S1 is permanently closed and the transistors S2 and S3 are alternately switched on and off by the controller C. The switching on and off mentioned here is executed in a clocked manner, in an embodiment in accordance with a predefined duty cycle. One embodiment makes provision for the transistor S2, on the one hand, and the transistors S1 and S2, on the other hand, to be alternately switched on and off in the event of an insulation fault on both sides (insulation resistance between U+ and M lower than the minimum value and insulation resistance between U− and M lower than the minimum value). As an alternative thereto, all the switches are permanently opened if there is an insulation fault on both sides.

In a vehicle on-board electrical system, A1 is adjoined by a first on-board electrical system branch and the side A2 by a second on-board electrical system branch, wherein the two on-board electrical system branches have different operating voltages or nominal voltages. The converter shown serves for transmitting power in a voltage-converting manner and in an embodiment for adjusting the different voltage levels on the side A1 and the side A2.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A galvanically coupling DC-to-DC converter, comprising:
    a first side having a first potential and a second potential;
    a second side having a first potential and a second potential;
    a first transistor;
    a second transistor;
    a third transistor;
    a first connecting point;
    a second connecting point, the first transistor, the second transistor, and a third transistor are connected in a series circuit via the first connecting point and the second connecting point, and are connected between the first potential and the second potential of the first side;
    a plurality of load inductors; and
    a controller connected to the first transistor, the second transistor, and the third transistor in an actuating manner such that the controller, in a converter state, actuates the first and the third transistor simultaneously in an on state;
    wherein each one of the plurality of load inductors is connected to a corresponding one of the two connecting points, and each of the plurality of load inductors are connected between one of the connecting points and one of the first potential or the second potential of the second side;
    wherein the controller is designed to actuate the first transistor continuously in an on state, and to actuate the third transistor and the second transistor alternately in an on state in the event of an insulation fault between the first potential of the first side and a reference potential, and the controller is designed to actuate the third transistor continuously in an on state, and to actuate the second transistor and the first transistor alternately in an on state in the event of an insulation fault between the second potential of the first side and a reference potential.

2. The DC-to-DC converter of claim 1, wherein each of the plurality of load inductors are connected in series between the connecting points connected thereto and the second side.

3. The DC-to-DC converter of claim 1, further comprising:
a common mode choke;
wherein the second side is connected, via the common-mode choke, to those ends of the load inductors that are remote from the connecting points.

4. The DC-to-DC converter of claim 1, wherein the second side is connected directly to those ends of the load inductors that are remote from the connecting points.

5. The DC-to-DC converter of claim 1, the first side further comprising an intermediate circuit capacitor that is connected in parallel to the first potential and the second potential of the first side.

6. The DC-to-DC converter of claim 1, the second side further comprising an intermediate circuit capacitor that is connected in parallel to the first potential and the second potential of the second side.

7. The DC-to-DC converter of claim 1, further comprising:
a common-mode choke connected to the load inductors; and
a smoothing capacitor connected between the load inductors and the common-mode choke.

8. The DC-to-DC converter of claim 1, wherein the controller, in a converter state, actuates the second transistor, and the first and the third transistor, alternately in an on state.

9. A galvanically coupling DC-to-DC converter, comprising:
a first side having a first potential and a second potential;
a second side having a first potential and a second potential;
a first transistor;
a second transistor;
a third transistor;
a first connecting point;
a second connecting point, the first transistor, the second transistor, and a third transistor are connected in a series circuit via the first connecting point and the second connecting point, and are connected between the first potential and the second potential of the first side;
a plurality of load inductors; and
a controller connected to the first transistor, the second transistor, and the third transistor in an actuating manner such that the controller, in a converter state, actuates the first and the third transistor simultaneously in an on state;
wherein each one of the plurality of load inductors is connected to a corresponding one of the two connecting points, and each of the plurality of load inductors are connected between one of the connecting points and one of the first potential or the second potential of the second side;
wherein the controller is designed to actuate the first transistor continuously in an on state, and to actuate the third transistor and the second transistor alternately in an on state in the event of an insulation fault between the first potential of the first side and a reference potential.

10. A galvanically coupling DC-to-DC converter, comprising:
a first side having a first potential and a second potential;
a second side having a first potential and a second potential;
a first transistor;
a second transistor;
a third transistor;
a first connecting point;
a second connecting point, the first transistor, the second transistor, and a third transistor are connected in a series circuit via the first connecting point and the second connecting point, and are connected between the first potential and the second potential of the first side;
a plurality of load inductors; and
a controller connected to the first transistor, the second transistor, and the third transistor in an actuating manner such that the controller, in a converter state, actuates the first and the third transistor simultaneously in an on state;
wherein each one of the plurality of load inductors is connected to a corresponding one of the two connecting points, and each of the plurality of load inductors are connected between one of the connecting points and one of the first potential or the second potential of the second side;
wherein the controller is designed to actuate the third transistor continuously in an on state, and to actuate the second transistor and the first transistor alternately in an on state in the event of an insulation fault between the second potential of the first side and a reference potential.

11. The DC-to-DC converter of claim 1, wherein the first transistor and the third transistor are connected symmetrically to the second transistor and are of identical design, and each of the plurality of load inductors are connected symmetrically to the second transistor and are of identical design.

12. The DC-to-DC converter of claim 1, wherein the DC-to-DC converter connects at least two on-board electrical system branches that have different nominal voltages in a voltage converting manner.

13. The DC-to-DC converter of claim 12, wherein the DC-to-DC converter and the at least two on-board electrical system branches are part of a vehicle on-board electrical system.

* * * * *